No. 856,360. PATENTED JUNE 11, 1907.
G. NAHLIK.
APPARATUS FOR ADDITION.
APPLICATION FILED DEC. 24, 1906.

Witnesses:   Inventor:
Georg Nahlik

UNITED STATES PATENT OFFICE.

GEORG NAHLIK, OF BUDAPEST, AUSTRIA-HUNGARY.

APPARATUS FOR ADDITION.

No. 856,360.  Specification of Letters Patent.  Patented June 11, 1907.

Application filed December 24, 1906. Serial No. 349,339.

*To all whom it may concern:*

Be it known that I, GEORG NAHLIK, a subject of the Emperor of Austria, and a resident of No. 30 Marvanyutcza, Budapest, Austria-Hungary, have invented certain new and useful Improvements in and Relating to Apparatus for Addition, of which the following is a specification.

The present invention relates to an apparatus which would perform addition quickly and surely on the manipulation of keys which operate on levers in tangent with wheels having numbers.

The accompanying drawing represents the invention.

Figure 1:
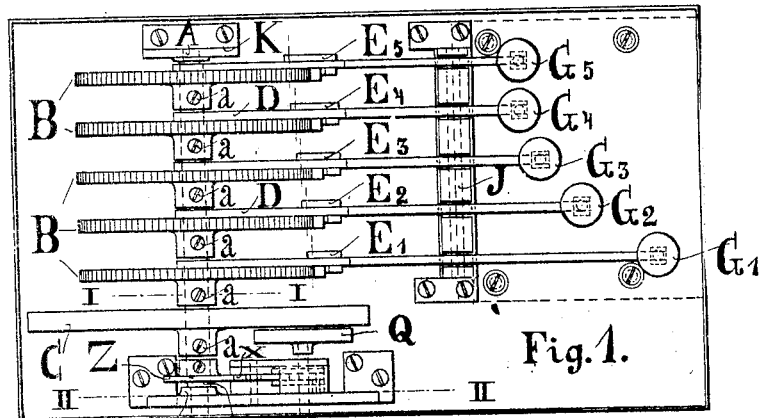
Figures 2, 6, 7:
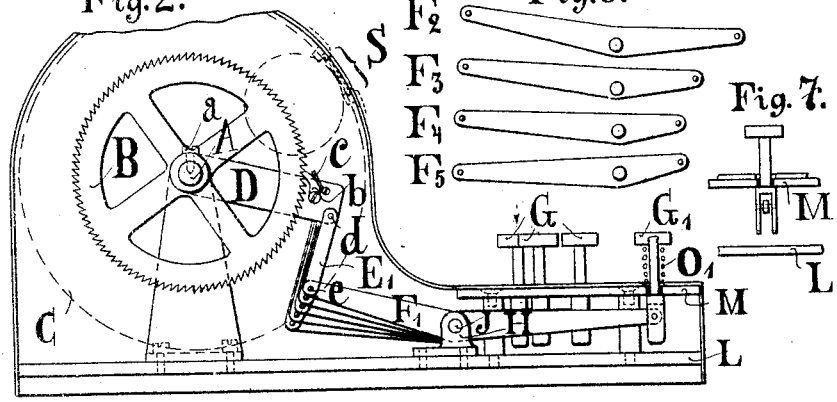
Figures 3, 4, 5:
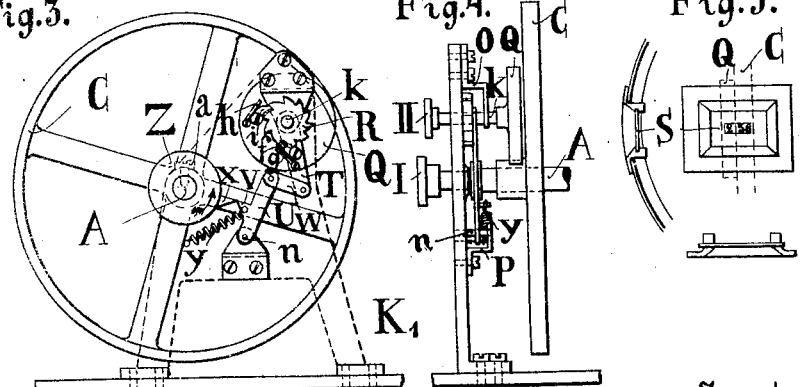

Figure 1 gives a top view of the apparatus. Fig. 2 a vertical section view after line 1—1 of Fig. 1. Fig. 3 a vertical section view after line 11—11 of Fig. 1. Fig. 4 a side view of Fig. 3. Figs. 5–7 are details.

An axle A, which runs on brackets or bearings K, K¹, is attached with a cipher wheel C and five toothed wheels B with screws $a$. Near each of the toothed wheels are levers D, which are turnably arranged on the axle A; and ratchets $b$, which are arranged on the said levers, are kept engaged with the teeth of the wheels B by springs $c$. An axle J, rigidly mounted on two brackets H, are arranged with two armed turnable levers F which are in connection with the levers D by members E. The length of the members E, between the turning points $d$ and $e$, and also of the front arms of the levers F are so graduated and fixed that the respective levers D can be uplifted from one to five tooth of the wheels B, to secure the correct strokes of the ratchets $b$ when the keys G are depressed, so that the ciphers, which are in the cipher wheel C, are brought in correspondence to the movement and arithmetical order as required, and the numbers are visible from an opening S.

Two plates M and L limit the stroke of the keys G; and the said keys are guided into their respective positions by springs O¹. When only one key is depressed; the other keys remain still although their ratchets slide on the teeth of their respective wheels and, during the return of the depressed key into its position, the ratchets prevent a backward movement of the wheels by acting as brake.

The wheels B having one hundred teeth each, correspond with the ciphers 0—99 which are in the cipher wheel C, and the ciphers are visible through the opening S, on the axle A being turned according to the requirements. The said opening also serves to observe the number of times the axle A has turned during an addition for which a separate arrangement is provided for in the frame K¹. The arrangement consists of two bearings O and P, which are rigidly attached to the said frame, having axles $k$ and $n$ turnably arranged. The axle $k$ carries a ten toothed wheel R and a cipher wheel Q having ciphers 0—9, and the axle $n$ carries a lever U which has a tooth V. Beside the ratchet wheel R an arm T, which is fixed on the axle $k$, has a ratchet $f$ controlled by a spring $g$, and the arm T and the lever U are operatively connected with each other by an arm W. The lever now consisting of parts U, W, and T is set in motion by the tooth $x$ which is on the disk Z which is rigidly attached on the axle A; and the said disk with tooth is so arranged that on the axle A making one turn, the said tooth comes in contact with the tooth V of the said lever and presses it forward so far until a tooth back of the wheel R has been engaged by the ratchet $f$; and immediately the tooth $x$ escapes from the tooth V the said ratchet turns the wheel R by the action of the spring Y. In consequence of the said movement of the wheel R, a corresponding numeral of the cipher wheel Q appears through the opening S. The ratchet $i$ and the spring $h$, which are arranged on the frame K¹, operates on the wheel R as a brake while the ratchet $f$ goes backward.

The keys G bear the numerals from one to five according to their respective limitation of moving the respective toothed wheels. When the numerals from 6 to 9 are to be represented; two keys are depressed, for bringing the combination, as follows. For 6, move keys 1 and 5. For 7, move keys 2 and 5. For 8, move keys 3 and 5, and for 9, move keys 4 and 5.

Owing to the fingers of the right hand being always on an equal number of keys, it is unnecessary to look on them, which is a great advantage.

An addition is begun with the unit side followed by the tens, hundreds, and so on. When the unit side of a sum are added, the total figure appears in the opening S, for instance, 256 which after the numeral 6 is first written down the number 25 are transferred to the tens side by turning the knob L of the axle A until the said number, which is on the cipher wheel $c$, appears in the said opening, and the knob II of the axle $k$, which bears the cipher wheel $q$, is turned until the figure 0 appears in place of the numeral 2 after which the next addition can be commenced.

I claim; ·

In an apparatus for making addition, the combination of an axle A turnably mounted on brackets K, K¹; the five toothed wheels B and a cipher wheel C all rigidly mounted on the axle A and attached by screws $a$; levers D turnably arranged on said axle, and ratchets $b$ on said levers controlled by springs $c$; an axle $j$ rigidly mounted on brackets H; levers F on the said axle connected with the levers D by members E; keys G, having the respective order of numerals, attached to the ends of the levers F; two plates M and L for limiting the strokes of the keys; springs $o^1$ between the keys and the plate M; plates O and P rigidly attached on the frame K¹; axles $k$ and $n$ turnably mounted on the said plates; a ten toothed wheel R and a cipher wheel Q with ciphers 0—9 fixed on the axle $n$; the lever U having a tooth V fixed to the said axle; the arm W joined to the said lever, and the arm $t$ having a ratchet wheel R fixed on the axle $k$ joined to the arm W; the pawl $f$ and spring $g$ for engaging with the ratchet wheel R; the pawl I and the spring $h$ for detaining the wheel R; disk Z having a tooth $x$ rigidly attached on the axle A; knobs I and II fixed to the ends of the axles A and $k$ respectively, and the spring Y for guiding the lever U into position, substantially as shown, and for the purpose described.

GEORG NAHLIK.

Witnesses:
D. DONHOFFER INILÁR.
CHARLES E. WALTTER.